Jan. 4, 1966  A. M. BEST  3,227,264
DISPENSER
Filed Dec. 19, 1963
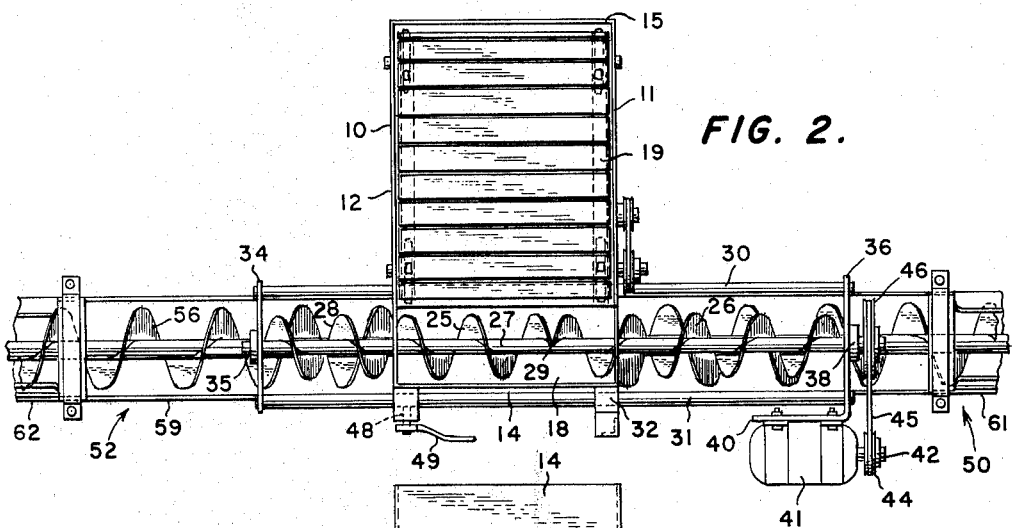
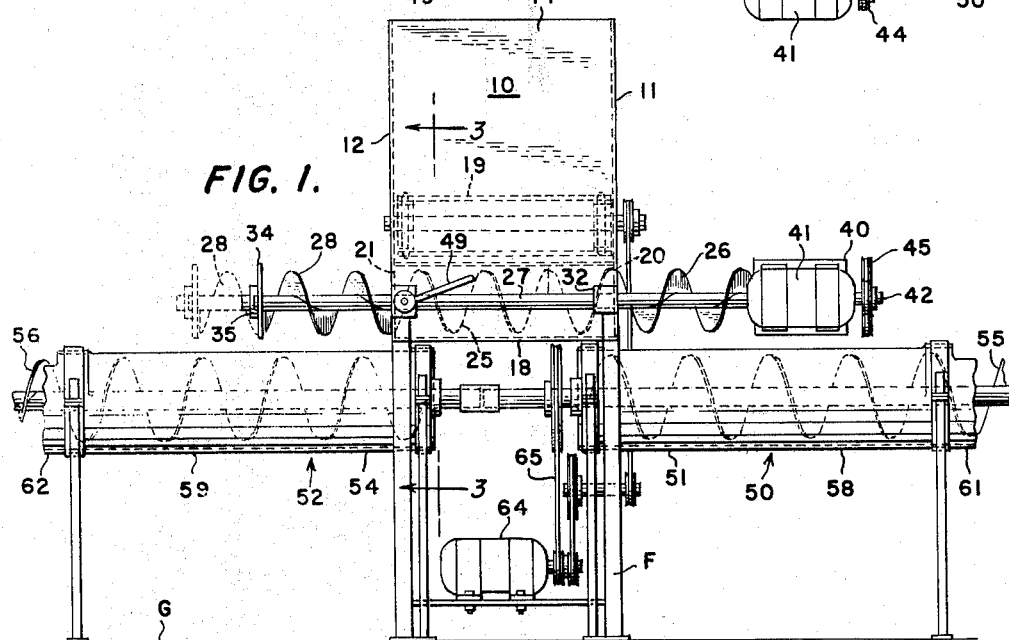
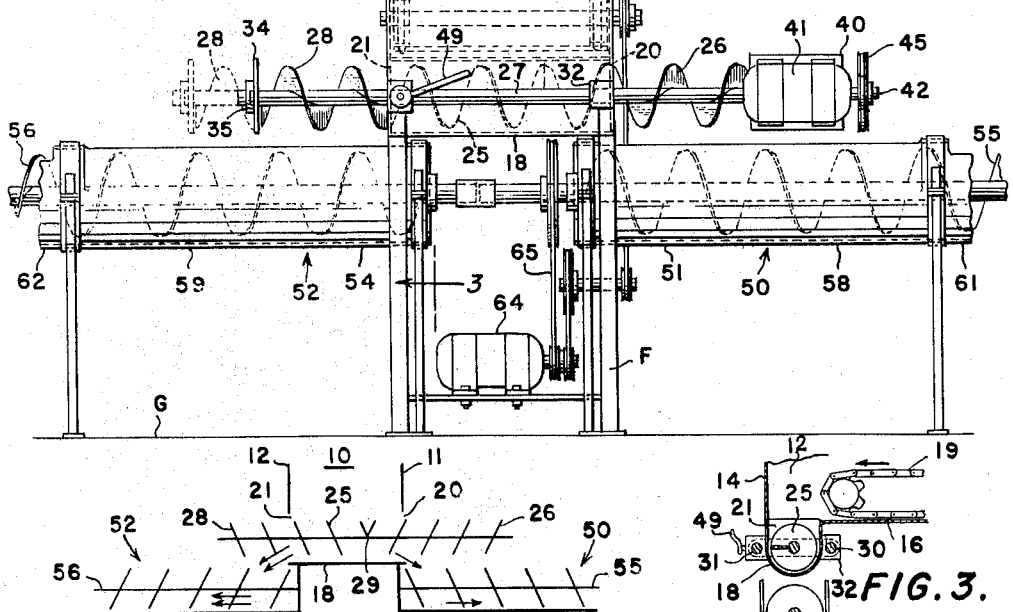
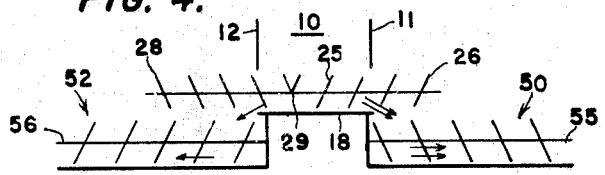
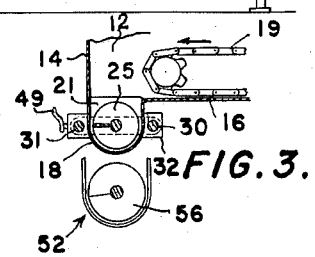
INVENTOR.
ALBERT M. BEST
BY
Joseph A. Brown
ATTORNEY

United States Patent Office 3,227,264
Patented Jan. 4, 1966

3,227,264
DISPENSER
Albert M. Best, New Holland, Pa., assignor to Sperry Rand Corporation, New Holland, Pa., a corporation of Delaware
Filed Dec. 19, 1963, Ser. No. 331,884
8 Claims. (Cl. 198—217)

This invention relates generally to dispensing apparatus. More particularly, the invention relates to a metering unit adapted to handle fluent solid material such as silage and to proportionately divide the material as it is discharged.

In many mechanical installations for handling feed for stock animals, it is desirable to divide a flow of silage or other material into streams of known proportions. After division, the streams can be delivered as desired to stock animals to be fed.

One object of this invention is to provide a double discharge metering device which will proportionately divide fluent solid material into two known portions, one for discharge through one outlet and the other for discharge through another outlet.

Another object of this invention is to provide a double discharge metering device of the character described whereby the size of one portion of discharged material may be the same as the other divided portion, or larger, or smaller, as desired.

Another object of this invention is to provide a metering device of the character described wherein positive means is employed for dividing material into known proportions, and the division being infinitely variable.

A further object of this invention is to provide a metering device of the character described wherein, when the discharge of material through one outlet is increased, the discharge of material through the other outlet is correspondingly decreased, and vice versa.

A still further object of this invention is to provide a metering device of the character described which is simply constructed, easily operated and low in cost.

Other objects of this invention will be apparent hereinafter from the specification and from the recital in the appended claims.

In the drawing:

FIG. 1 is a front elevation of a double discharge metering device constructed according to this invention;

FIG. 2 is a plan view of FIG. 1;

FIG. 3 is a vertical section, on a reduced scale, taken on the line 3—3 of FIG. 1 looking in the direction of the arrows; and FIGS. 4 and 5 are diagrammatic views illustrating the operation of the metering device.

Referring now to the drawing by numerals of reference, 10 denotes a hopper supported on the ground G by a frame F. The hopper has side walls 11 and 12, a front wall 14, a rear wall 15 and a horizontal bottom wall 16 which terminates spaced from the front wall to provide space for a depressed U-shaped trough 18. Operative across bottom 16 of hopper 10 to convey material away from rear wall 15 and toward front wall 14 for deposit in the trough 18 is an endless, slat conveyor 19.

Side wall 11 is provided with a discharge outlet 20 and side wall 12 has a discharge outlet 21. These outlets are in register with each other and they are located at opposite ends respectively of trough 18. Located in the trough and coextensive therewith is an auger 25. This auger has a first section 26 which projects through outlet 20 and a second section 28 which projects through outlet 21. The flights on the respective auger sections are oppositely wound on a shaft 27 and they meet at location 29 within hopper 10. When auger 25 is rotated, the section 26 conveys and discharges material through outlet 20 while section 28 conveyos and discharges material through outlet 21.

Extending along opposite sides of trough 18 are rails 30 and 31 which extend through bearing blocks 32 fastened to the hopper structure. The rails are equally spaced from auger 25 and parallel to it. At one end, the rails are connected to each other by a transverse bracket 34 having a bearing 35 rotatably carrying the adjacent end of shaft 27 of auger 25. The opposite ends of the rails are connected by a bracket 36 having a bearing 38 rotatably carrying the other end of the auger shaft.

Bracket 36 is L-shaped, having an arm 40 to which a motor 41 is connected. Motor 41 has an output shaft 42 mounting a sheave 44 connected by a belt 45 to a sheave 46 secured to auger shaft 27.

Thus, auger 25 and the motor 41 for driving it are both carried on rails 30 and 31. The location of auger 25 relative to hopper 10 is variable by sliding the rails 30 and 31 through the blocks 32. A clamp is shown at 48 and operated by a handle 49 to engage rail 31 and lock auger 25 in adjusted position. When the auger is shifted, the motor 41 and the drive connections to the auger shift with it.

A stock feeder 50 extends away from side wall 11 of hopper 10. The feeder has an end 51 located to receive material from outlet 20. A second feeder 52 is situated at the opposite side of the hopper and provided with an end 54 to receive material discharged through outlet 21. Feeder 50 has an auger 55 and feeder 52 an auger 56 operative to convey material away from hopper 10. Feeder 50 has a short U-shaped section 58 and feeder 52 has a similar section 59, both of which are fixed relative to the hopper. Extending outwardly from section 58 is a longtiudinally slotted container section 61 which is rotatable about its longitudinal axis. Section 58 has a similar slotted container section 62. When feed has been conveyed and distributed throughout the lengths of the section 61 and 62, they can be rotated to dump the feed. The structure employed for the feeders may be similar to that shown in U.S. Patent No. 3,117,681. A motor 64 is provided on frame F and connected by a power train 65 to the feeders 50 and 52 and to conveyor 19.

In operation, and with auger 25 axially located as shown in FIGS. 1 and 4, the length of auger section 28 within hopper 10 is greater than the length of auger section 26 within the hopper. Therefore, when auger 25 is rotated, the amount of material discharged through outlet 21 will be substantially larger than the amount of material discharged through outlet 20. In the auger position shown, approximately a one third, two thirds proportional division of material will result. If the operator of device wishes to have the proportionate division of feed opposite to that shown in FIG. 4, he merely releases the clamp 48 and slides rails 30 and 31 axially to the left to move auger 25 from the position shown in FIG. 4 to the position shown in FIG. 5. This moves the point 29 where the auger sections meet away from side wall 11 of the hopper and toward side wall 12. When properly located, clamp 48 is tightened to lock the auger in place. When auger 25 is then rotated, a larger proportion of feed material will be discharged through outlet 20 and a lesser proportion through outlet 21.

With this arrangement, the relative division and discharge of material from hopper 10 is infinitely variable. Any proportionate division can be provided. Further, all of the material can be discharged through outlet 20 or all through outlet 21 merely by establishing the appropriate location of auger 25. The metering device disclosed is simply constructed and can be manufactured at low cost. The separation and division of material is positive and easily obtained.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A double discharge metering device for fluent solid material comprising a hopper having first and second spaced lateral outlets, an auger in said hopper having a first section projecting through said first outlet and a second section projecting through said second outlet, right hand flights on said first auger section and left hand flights on said second section, a pair of spaced rails on opposite sides respectively of said auger, means on said hopper supporting said rails parallel to said auger and for longitudinal shiftable adjustment relative to the hopper, means on said rails rotatably supporting said auger, a drive motor on said rails and connected to said auger to rotate the auger in such direction that said first section discharges material through said first outlet and said second section discharges material through said second outlet, said right and left hand flights meeting at a location within said hopper, and said location being shiftable upon adjustment of said rails relative to said hopper whereby the relative proportions of said auger sections within said hopper may be varied to thereby regulate the relative discharge of material through said outlets.

2. A double discharge metering device as recited in claim 1 wherein said right hand flights on said auger are the same in diameter and pitch as said left hand flights.

3. A double discharge metering device as recited in claim 1 wherein releaseable clamp means is provided for holding said rails in adjusted position relative to said hopper.

4. A double discharge metering device as recited in claim 1 wherein said rails are supported outside said hopper and the means on the rails rotatably supporting said auger comprising a transverse bracket at each end of the rails.

5. In combination, a hopper for fluent solid material, said hopper having a pair of vertical side walls and a horizontal bottom wall, one side wall having a first outlet adjacent said bottom wall and the other side wall having a second outlet in register with the first outlet, a first stock feeder extending away from said one side wall and having one end located to receive material from said first outlet, a second stock feeder extending away from said other side wall and having one end located to receive material from said second outlet, an auger extending across said hopper having a first section projecting through said first outlet and a second section projecting through said second outlet, drive means to rotate said auger, flights on said first auger section operable to convey material through said first outlet for discharge into said first stock feeder, flights on said second auger section operable to convey material through said second outlet for discharge into said second stock feeder, the flights on said first auger section meeting the flights on said second auger section at a location within said hopper, rail means on said hopper and parallel to said auger, means supporting said auger on said rail means, and said rail means being supported on said hopper for bodily axial adjustment whereby the relative proportions of said auger sections within said hopper may be varied to thereby regulate the relative discharge of material through said outlets and to said feeders.

6. The combination recited in claim 5 wherein means is provided for locking said auger in adjusted position.

7. The combination recited in claim 5 wherein said drive means comprises a motor carried on said rail means whereby when the location of the auger is adjusted the relative position of the motor to the auger remains constant.

8. A double discharge metering device for fluent solid material comprising a hopper having first and second lateral outlets, an auger in said hopper having a first section protruding through said first outlet and a second section projecting through said second outlet, right hand flights on said first auger section and left hand flights on said second section, rail means adjacent said auger and parallel thereto, means on said hopper supporting said rail means for longitudinal shiftable adjustment relative to the hopper, means on said rail means rotatably supporting said auger, drive means connected to said auger to rotate the auger in such direction that said first section discharges material through said first outlet and said second section discharges material through said second outlet, said right and left hand flights meeting at a location within said hopper, and said location being shiftable upon adjustment of said rail means relative to said hopper whereby the relative proportions of said auger section within said hopper may be varied to thereby regulate relative discharge of material through said outlets.

References Cited by the Examiner

UNITED STATES PATENTS

| | | | |
|---|---|---|---|
| 2,765,899 | 10/1956 | Ballard | 198—64 |
| 2,961,126 | 11/1960 | Craig | 222—14 |
| 3,152,702 | 10/1964 | Klemm | 214—519 |

FOREIGN PATENTS 86,597   6/1936   Sweden.

HUGO O. SCHULZ, *Primary Examiner.*

WILLIAM A. LABORDE, RICHARD E. AEGERTER,
*Examiners.*